US009015572B2

(12) United States Patent
Lanza et al.

(10) Patent No.: US 9,015,572 B2
(45) Date of Patent: Apr. 21, 2015

(54) GROUPING TABLES

(75) Inventors: Nathaniel Cleverly Lanza, Pittsburgh, PA (US); Christopher Douglas Weeldreyer, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 1529 days.

(21) Appl. No.: 12/286,721

(22) Filed: Sep. 30, 2008

(65) Prior Publication Data

US 2009/0106310 A1     Apr. 23, 2009

Related U.S. Application Data

(63) Continuation-in-part of application No. 11/647,936, filed on Dec. 28, 2006.

(51) Int. Cl.
*G06F 17/00* (2006.01)
*G06F 17/24* (2006.01)

(52) U.S. Cl.
CPC ................................. *G06F 17/246* (2013.01)

(58) Field of Classification Search
CPC .............................. G06F 17/246; G06F 17/245
USPC .......... 715/212, 227, 243; 707/752, 754, 755, 707/756
See application file for complete search history.

(56) References Cited

U.S. PATENT DOCUMENTS

| | | | |
|---|---|---|---|
| 5,542,040 A * | 7/1996 | Chang et al. .................. 715/776 |
| 6,626,959 B1 * | 9/2003 | Moise et al. .................. 715/210 |
| 7,539,944 B2 | 5/2009 | Gauthier et al. | |
| 7,546,523 B2 | 6/2009 | Aureglia et al. | |
| 7,583,266 B2 * | 9/2009 | Ben-Tovim et al. .......... 345/440 |
| 7,774,711 B2 * | 8/2010 | Valeski .......................... 715/752 |
| 2002/0013786 A1 * | 1/2002 | Machalek ..................... 707/503 |
| 2002/0116417 A1 * | 8/2002 | Weinberg et al. ............. 707/517 |
| 2004/0143788 A1 | 7/2004 | Aureglia et al. | |
| 2006/0277087 A1 | 12/2006 | Error | |
| 2007/0208992 A1 | 9/2007 | Koren | |
| 2008/0046803 A1 | 2/2008 | Beauchamp et al. | |
| 2008/0140559 A1 | 6/2008 | Ram et al. | |
| 2009/0083613 A1 | 3/2009 | Davis | |
| 2009/0083615 A1 | 3/2009 | Kotler et al. | |
| 2009/0319880 A1 * | 12/2009 | Collie et al. .................. 715/219 |
| 2010/0332379 A1 | 12/2010 | Ram et al. | |

OTHER PUBLICATIONS

Paul Cornell, "Building a Real-Time Data Server in Excel 2002", Jul. 2001 http://msdn.microsoft.com/en-us/library/aa140059.*
"OfficeToolTips Excel 2003 Tip: Creating Subtotals" Copyright 2009-2013 http://www.officetooltips.com/excel_2003/tips/creating_subtotals.html.*
Mary Richardson "Quickly sort and total your data with Excel's Data-Subtotals" TechRepublic, Jun. 6, 2001, http://www.techrepublic.com/article/quickly-sort-and-total-your-data-with-excels-data-subtotals/.*

* cited by examiner

*Primary Examiner* — Adam M Queler
(74) *Attorney, Agent, or Firm* — Fletcher Yoder, P.C.

(57) ABSTRACT

Grouping a set of data is disclosed. In some embodiments, a set of data is grouped with respect to a column and/or a row associated with the set of data in response to receiving a selection of an option to group the set of data with respect to the column and/or the row. In some embodiments, the grouping of the set of data is based on real time values of the set of data and is automatically and dynamically updated in response to changes in the set of data.

18 Claims, 9 Drawing Sheets

|   | A | B | C | D | E |
|---|---|---|---|---|---|
| 1 |   | car | date |   |   |
| 2 | ▼ coupe |   |   |   |   |
| 3 |   | coupe | Jan-08 |   |   |
| 4 |   | coupe | Jul-08 |   |   |
| 5 |   | coupe | Jan-08 |   |   |
| 6 |   | coupe | Jul-08 |   |   |
| 7 |   | coupe | Feb-08 |   |   |
| 8 |   | coupe | Aug-08 |   |   |
| 9 |   | coupe | Feb-08 |   |   |
| 10 |   | coupe | Aug-08 |   |   |
| 11 |   | coupe | Mar-08 |   |   |
| 12 |   | coupe | Sep-08 |   |   |
| 13 |   | coupe | Mar-08 |   |   |
| 14 |   | coupe | Sep-08 |   |   |
| 15 | ▼ sedan |   |   |   |   |
| 16 |   | sedan | Apr-08 |   |   |
| 17 |   | sedan | Apr-08 |   |   |
| 18 |   | sedan | May-08 |   |   |
| 19 |   | sedan | May-08 |   |   |
| 20 |   | sedan | Jun-08 |   |   |
| 21 |   | sedan | Jun-08 |   |   |

FIG. 1C

|   | A | B | C | D | E |
|---|---|---|---|---|---|
| 1 |   | car | date |   |   |
| 2 | ▼ SUV |   |   |   |   |
| 3 |   | SUV | Jan-08 |   |   |
| 4 | ▼ coupe |   |   |   |   |
| 5 |   | coupe | Jul-08 |   |   |
| 6 |   | coupe | Jan-08 |   |   |
| 7 |   | coupe | Jul-08 |   |   |
| 8 |   | coupe | Feb-08 |   |   |
| 9 |   | coupe | Aug-08 |   |   |
| 10 |   | coupe | Feb-08 |   |   |
| 11 |   | coupe | Aug-08 |   |   |
| 12 |   | coupe | Mar-08 |   |   |
| 13 |   | coupe | Sep-08 |   |   |
| 14 |   | coupe | Mar-08 |   |   |
| 15 |   | coupe | Sep-08 |   |   |
| 16 | ▼ sedan |   |   |   |   |
| 17 |   | sedan | Apr-08 |   |   |
| 18 |   | sedan | Apr-08 |   |   |
| 19 |   | sedan | May-08 |   |   |
| 20 |   | sedan | May-08 |   |   |
| 21 |   | sedan | Jun-08 |   |   |
| 22 |   | sedan | Jun-08 |   |   |

| | A | B | C | D | E |
|---|---|---|---|---|---|
| | | car | date | region | |
| 2 | ▼ north | | | | |
| 3 | ▼ 2008 Q1 | | | | |
| 4 | | SUV | Jan-08 | north | |
| 5 | | coupe | Jan-08 | north | |
| 6 | | coupe | Mar-08 | north | |
| 7 | ▼ 2008 Q3 | | | | |
| 8 | | coupe | Aug-08 | north | |
| 9 | ▼ 2008 Q2 | | | | |
| 10 | | sedan | Apr-08 | north | |
| 11 | | sedan | Apr-08 | north | |
| 12 | ▼ south | | | | |
| 13 | ▼ 2008 Q1 | | | | |
| 14 | | coupe | Feb-08 | south | |
| 15 | ▼ 2008 Q3 | | | | |
| 16 | | coupe | Jul-08 | south | |
| 17 | | coupe | Aug-08 | south | |
| 18 | | coupe | Sep-08 | south | |
| 19 | ▼ 2008 Q2 | | | | |
| 20 | | sedan | May-08 | south | |
| 21 | | sedan | May-08 | south | |
| 22 | | sedan | Jun-08 | south | |
| 23 | ▼ west | | | | |
| 24 | ▼ 2008 Q1 | | | | |
| 25 | | coupe | Feb-08 | west | |
| 26 | | coupe | Mar-08 | west | |
| 27 | ▼ 2008 Q3 | | | | |
| 28 | | coupe | Jul-08 | west | |
| 29 | | coupe | Sep-08 | west | |
| 30 | ▼ 2008 Q2 | | | | |
| 31 | | sedan | Jun-08 | west | |

|   | A | B | C | D | E |
|---|---|---|---|---|---|
|   |   | car | date | region |   |
| 2 | ▼ north |   | 6 |   |   |
| 3 | ▼ 2008 Q1 |   | 3 |   |   |
| 4 |   | SUV | Jan-08 | north |   |
| 5 |   | coupe | Jan-08 | north |   |
| 6 |   | coupe | Mar-08 | north |   |
| 7 | ▼ 2008 Q3 |   | 1 |   |   |
| 8 |   | coupe | Aug-08 | north |   |
| 9 | ▼ 2008 Q2 |   | 2 |   |   |
| 10 |   | sedan | Apr-08 | north |   |
| 11 |   | sedan | Apr-08 | north |   |
| 12 | ▼ south |   | 7 |   |   |
| 13 | ▼ 2008 Q1 |   | 1 |   |   |
| 14 |   | coupe | Feb-08 | south |   |
| 15 | ▼ 2008 Q3 |   | 3 |   |   |
| 16 |   | coupe | Jul-08 | south |   |
| 17 |   | coupe | Aug-08 | south |   |
| 18 |   | coupe | Sep-08 | south |   |
| 19 | ▼ 2008 Q2 |   | 3 |   |   |
| 20 |   | sedan | May-08 | south |   |
| 21 |   | sedan | May-08 | south |   |
| 22 |   | sedan | Jun-08 | south |   |
| 23 | ▼ west |   | 5 |   |   |
| 24 | ▼ 2008 Q1 |   | 2 |   |   |
| 25 |   | coupe | Feb-08 | west |   |
| 26 |   | coupe | Mar-08 | west |   |
| 27 | ▼ 2008 Q3 |   | 2 |   |   |
| 28 |   | coupe | Jul-08 | west |   |
| 29 |   | coupe | Sep-08 | west |   |
| 30 | ▼ 2008 Q2 |   | 1 |   |   |
| 31 |   | sedan | Jun-08 | west |   |

FIG. 3B

|   | A | B | C | D | E |
|---|---|---|---|---|---|
| 1 |   | car | date | region |   |
| 2 | ▶ north |   | 6 |   |   |
| 3 | ▼ 2008 Q1 |   | 3 |   |   |
| 4 |   | SUV | Jan-08 | north |   |
| 5 |   | coupe | Jan-08 | north |   |
| 6 |   | coupe | Mar-08 | north |   |
| 7 | ▶ 2008 Q3 |   | 1 |   |   |
| 9 | ▶ 2008 Q2 |   | 2 |   |   |
| 12 | ▶ south |   | 7 |   |   |
| 23 | ▶ west |   | 5 |   |   |

GROUPING TABLES

CROSS REFERENCE TO OTHER APPLICATIONS

This application is a continuation in part of co-pending U.S. patent application Ser. No. 11/647,936, entitled SMART TABLES, filed Dec. 28, 2006, which is incorporated herein by reference for all purposes.

BACKGROUND OF THE INVENTION

Existing spreadsheet applications provide an option to generate a report for a set of data, including options for organizing the set of data into a table and grouping the set of data. If the set of data is changed in any way, however, typically the report must be regenerated or refreshed to reflect the change in the set of data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet or canvas of a spreadsheet document may include a desired number of table objects as well as any desired number of other objects such as charts, graphs, images, etc. Although in some of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

Grouping a set of data, such as a table of cells, is disclosed. In various embodiments, a table may be grouped by one or more columns and/or rows associated with the table. In some embodiments, grouping includes sorting a table such that, for example, rows (columns) that have the same value in a particular column (row) are grouped together. In some embodiments, grouping includes pivoting a column or a row of a table. Pivoting a column of a table, for example, includes automatically creating a new row for each unique value and/or division of the pivoted column.

As described, grouping changes the view or layout of a table of cells. The grouping of a table is based on the current data values of the table and is automatically and dynamically updated in real time to reflect the correct grouping as the data in the table is changed. Although some of the examples described herein are with respect to grouping the rows of a table with respect to one or more columns, the described techniques may be analogously employed to group the columns of a table with respect to one or more rows.

Figure 1A:
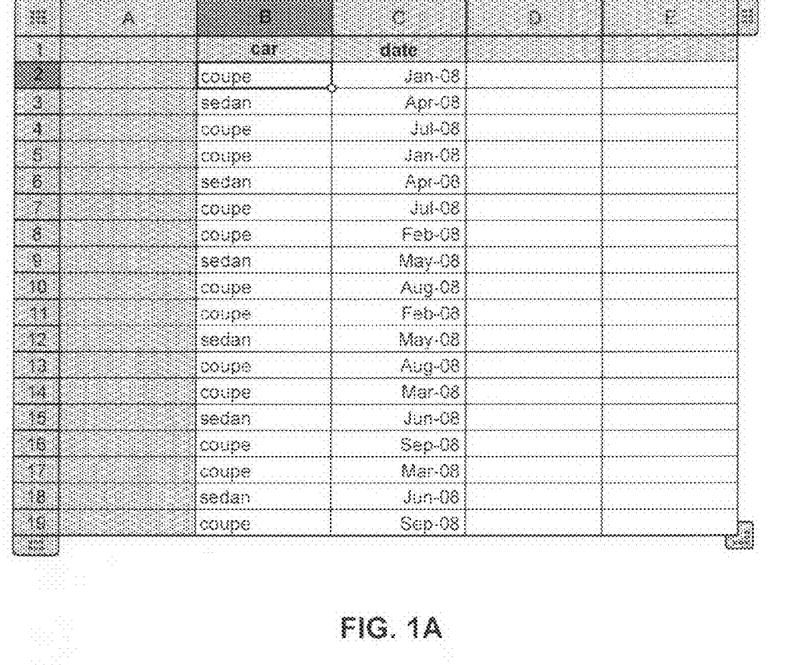
FIGS. 1A-1D illustrate embodiments of grouping a set of data.
Figure 1B:
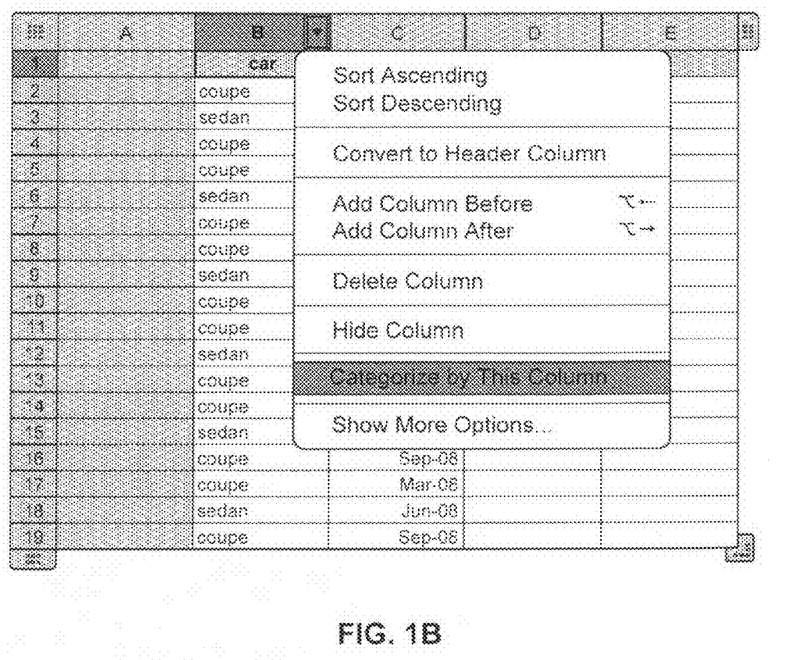
Figure 1C:
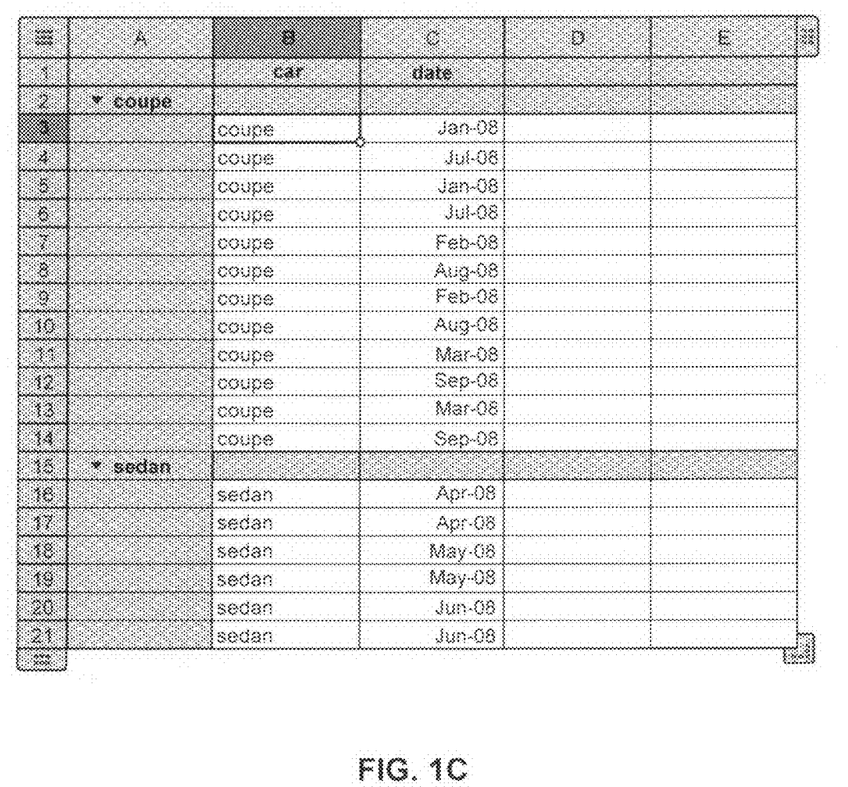

FIGS. 1A-1D illustrate embodiments of grouping a set of data. FIG. 1A illustrates an embodiment of a table of cells. In the given example, the table comprises two columns ("car" and "date") of data. FIG. 1B illustrates an embodiment of a user interface for selecting an option to categorize or group the table. In some embodiments, grouping a table by a particular column results in one or more group divisions to be created for the values of the column. In some embodiments, a group division is created for each unique value in a column. In some embodiments, a group division row is added to a table for each group division of a column. FIG. 1C illustrates an embodiment of a result of grouping the table by the "car" column. A group division is created for each unique value ("coupe" and "sedan") in the column, and an associated group division row (row 2 and row 15) is added to the table.

In some embodiments, a control associated with collapsing or expanding a group division is provided with each group division row as indicated in the given example (in which both group divisions are expanded). In some embodiments, when a table is grouped by a particular column, that column is removed or hidden from the grouped view of the table since it provides redundant data. In other embodiments, the column remains in the grouped view as in the example of FIG. 1C so that, for example, the data in the column can be changed if desired.

Figure 1D:
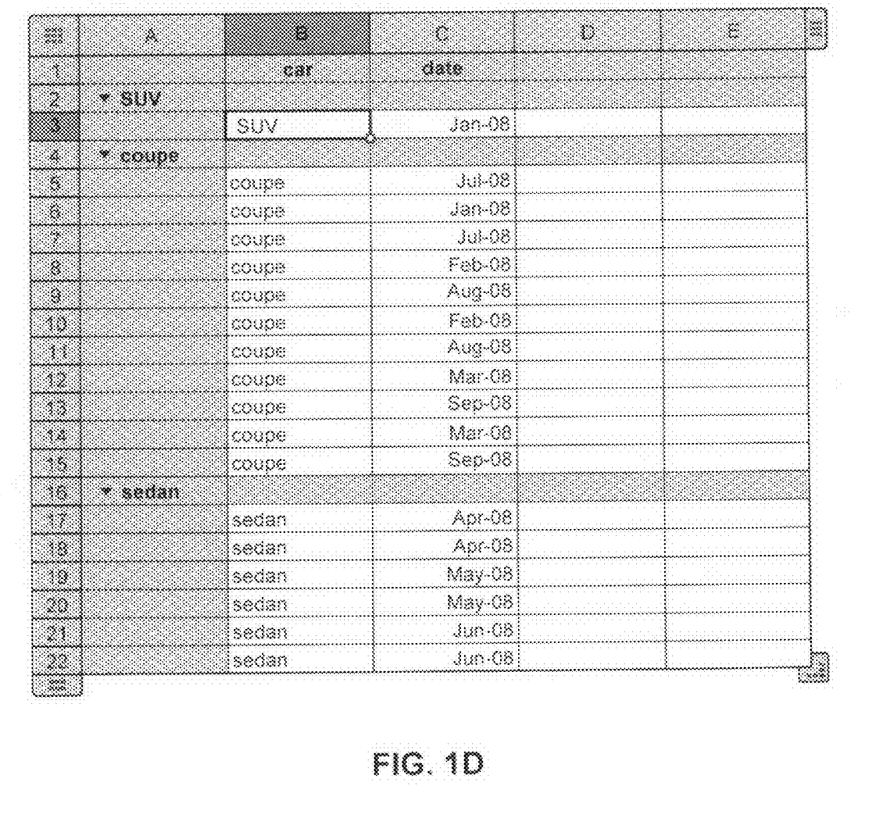

The grouping of a table is automatically and dynamically updated in response to changes in the data included in the table. In various embodiments, for example, a new group division is automatically created for a new data value added to a grouped column, an empty group division is automatically deleted or removed, a row of the table is automatically moved to an appropriate group division if the value of the row in the grouped column is changed, the value of a row in the grouped column is automatically updated in response to the row being moved into a different group division to have the value of that group division, etc. FIG. 1D illustrates an embodiment of adding a row to the table that has a new unique value in the "car" column and the automatic creation of a new group division "SUV" in the table for the row.

Figure 2A:
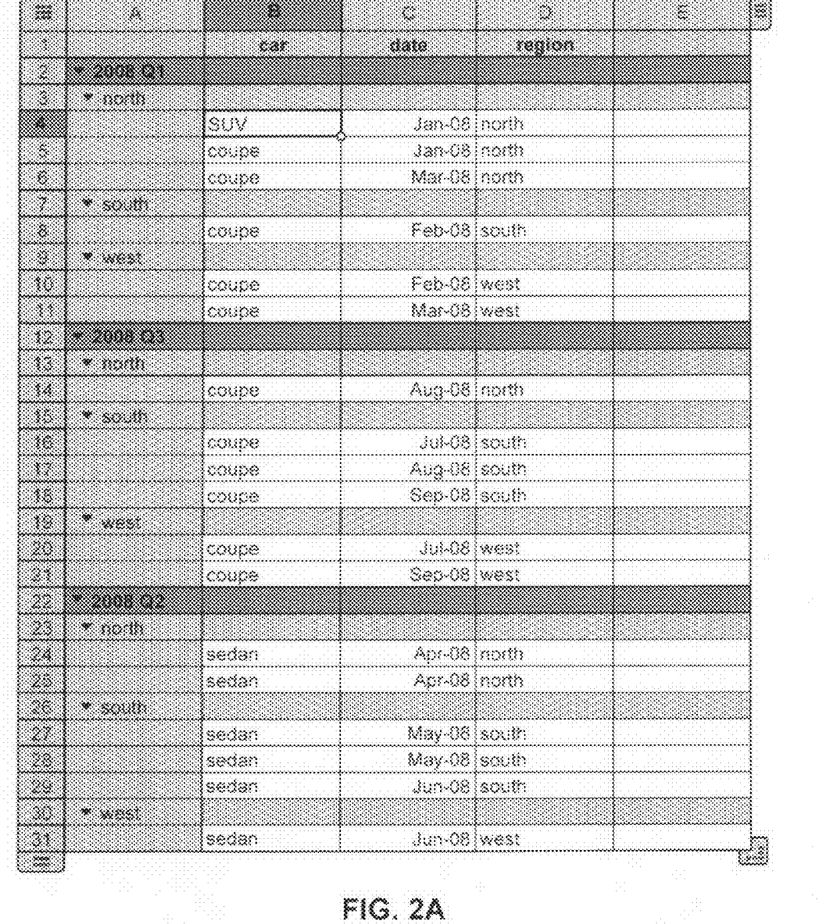
FIGS. 2A-2D illustrate embodiments of multi-level groupings of a table.

In some embodiments, multiple levels of grouping are supported. For example, a table may be hierarchically grouped by multiple columns. In various embodiments, the various features described above with respect to a single group are applicable to multi-level groups. FIGS. 2A-2D illustrate embodiments of multi-level groupings of the table of FIG. 1D. As depicted, a new column "region" has now been added to the table. FIG. 2A illustrates an embodiment of multi-level grouping of the table in which the "date" column comprises the parent group and the "region" column comprises the child group.

In some embodiments, the group divisions for a column of dates and/or times comprise an appropriate duration or interval type (e.g., seconds, minutes, hours, days, weeks, months, quarters, years, etc.) for the values in that particular column. In some embodiments, an appropriate interval type is selected or specified by a user. In some embodiments, an appropriate interval type is automatically selected based on the span of the dates and/or times. In some such cases, for example, the date and/or time values of a column are parsed, and one or more iterations are performed to determine the number of group divisions that the values fall into and/or the relative populations of the group divisions that the values fall into for one or more interval types. One or more thresholds may be employed to select an interval type that does not result in too many or too few group divisions so that the values can be presented in a practical number of group divisions. If an automatically selected interval type is not the one desired, a user may manually select and/or specify a desired interval type. In other embodiments, an appropriate or desired interval type for group divisions may be similarly selected for other types of data.

Figure 2B:
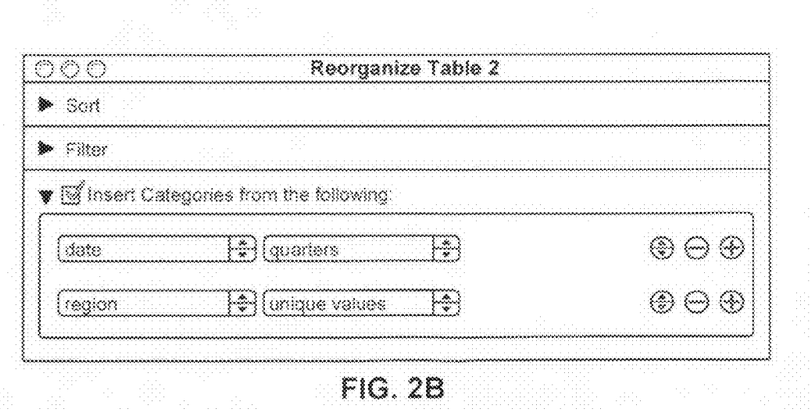

Returning to FIG. 2A, the table is first grouped by the "date" column and then by the "region" column. As depicted, the date data is divided into quarters, which results in three group divisions of the "date" column. The table is further grouped by the "region" column. The "region" column comprises three unique values ("north", "south", "west"), which results in each date group division to include up to three group divisions of the "region" column as sub-groups. As depicted in the given example, a group division row is added to the table for each group division, and each such row includes a control to expand and collapse the rows associated with the group division. FIG. 2B illustrates an embodiment of a user interface for specifying the grouping of the table. As depicted, options to group the table by quarters of the "date" column and unique values of the "region" column have been selected. In this example, the order of the specification of the groups dictates the order of the group hierarchy, i.e., first "date", then "region".

Figure 2C:
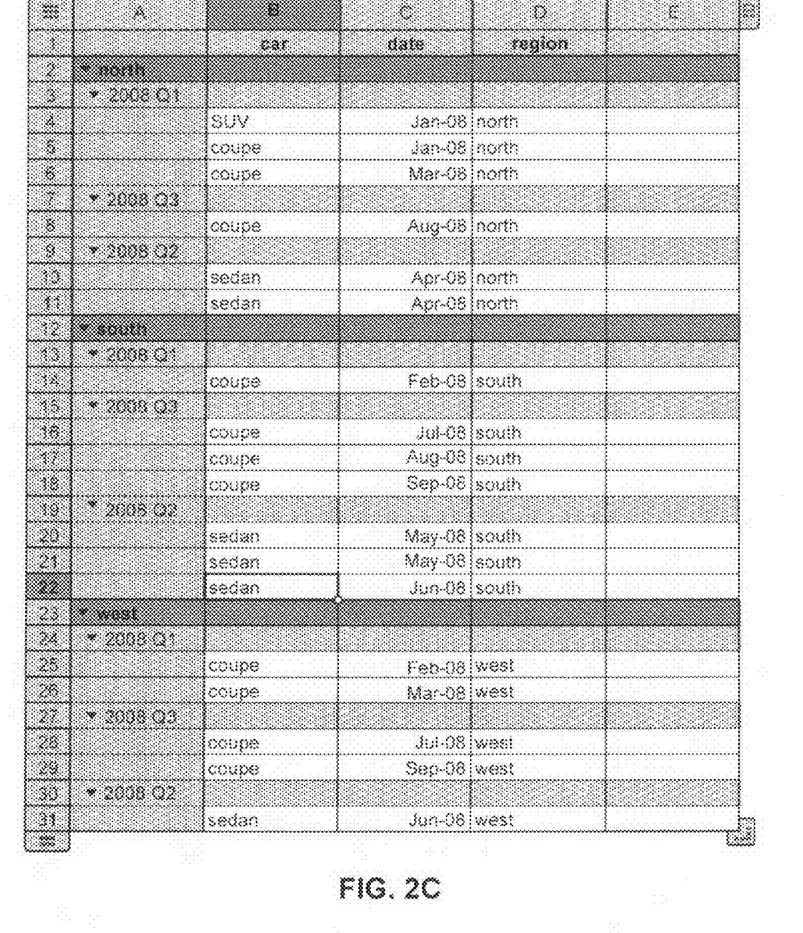
Figure 2D:
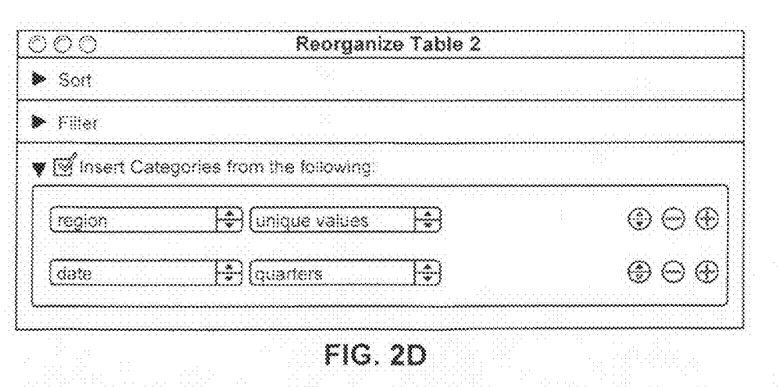

In various embodiments, the grouping criteria may be reordered to rearrange the table hierarchy, allowing different views of the table data. FIG. 2C illustrates an embodiment of multi-level grouping of the table in which the "region" column comprises the parent group and the "date" column comprises the child group. FIG. 2D illustrates an embodiment of a user interface for specifying the grouping of the table of FIG. 2C. As depicted, the order of the specification of the groups in FIG. 2D has been reversed with respect to that of FIG. 2B, i.e., "region" is now first and hence the parent group with "date" as the child group.

In some embodiments, one or more summary functions may be included for one or more group divisions of a table. Example summary functions include Subtotal, Average, Minimum, Maximum, Count, etc. The result or value of a summary function for a particular group division is based on the rows of data included in that group division. For example, the result may depend on the values of the rows in the grouped column. In some embodiments, the result is displayed in the associated group division row. In some embodiments, a summary function associated with a group division is automatically and dynamically updated as data and/or groupings change.

Figure 3A:
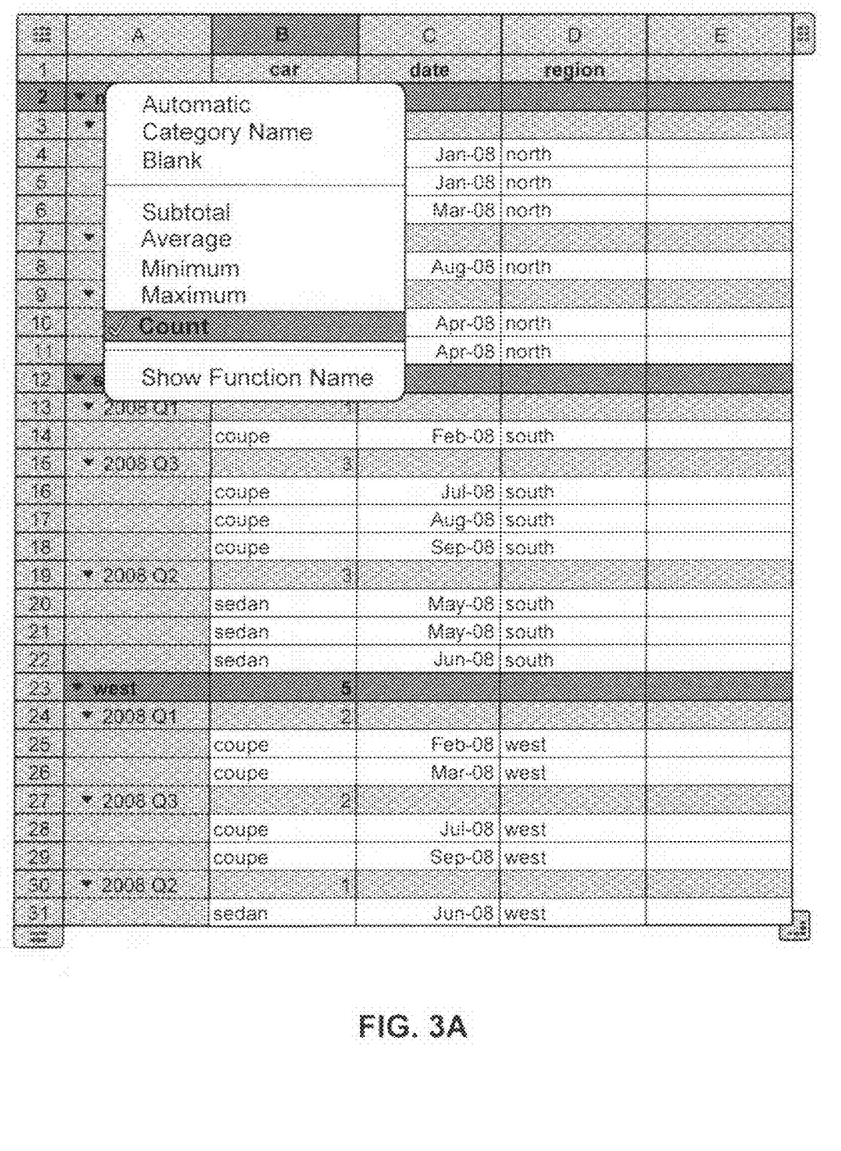
FIGS. 3A-3C illustrate embodiments of including a summary function.
Figure 3B:
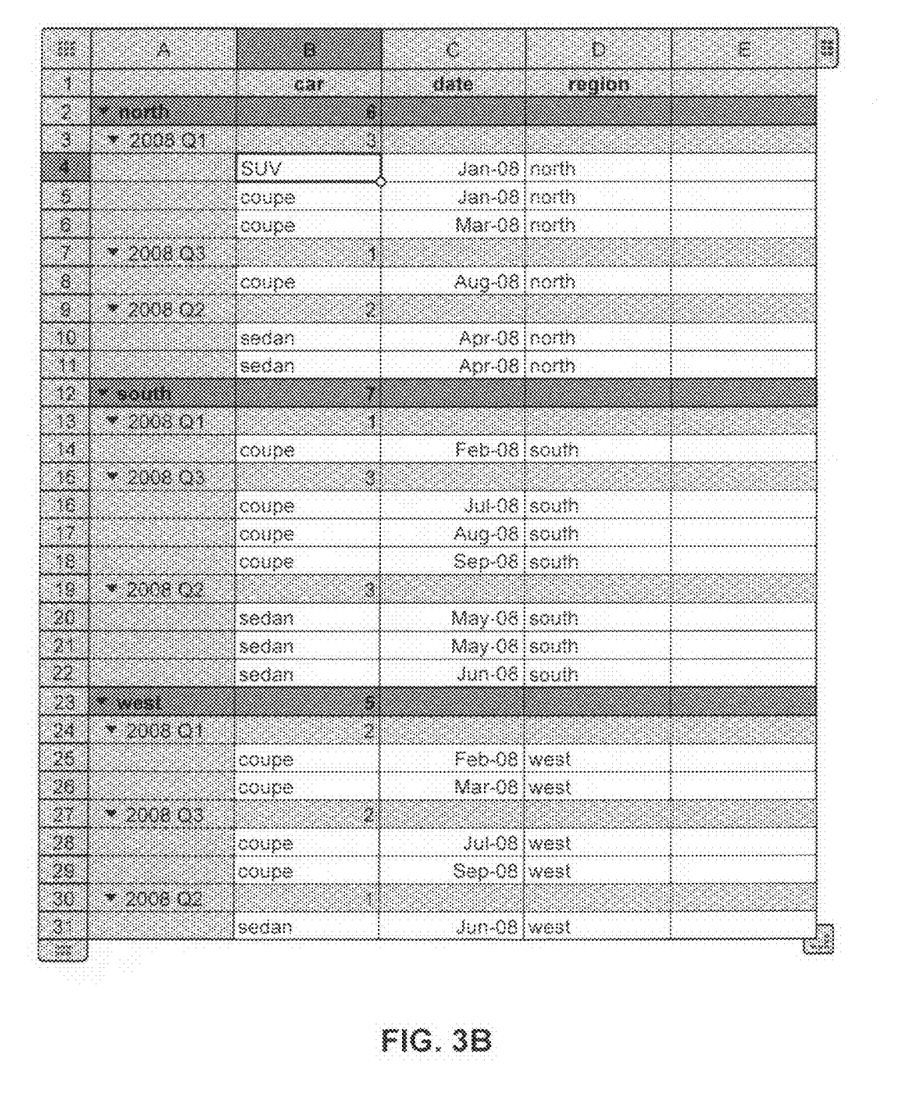
Figure 3C:
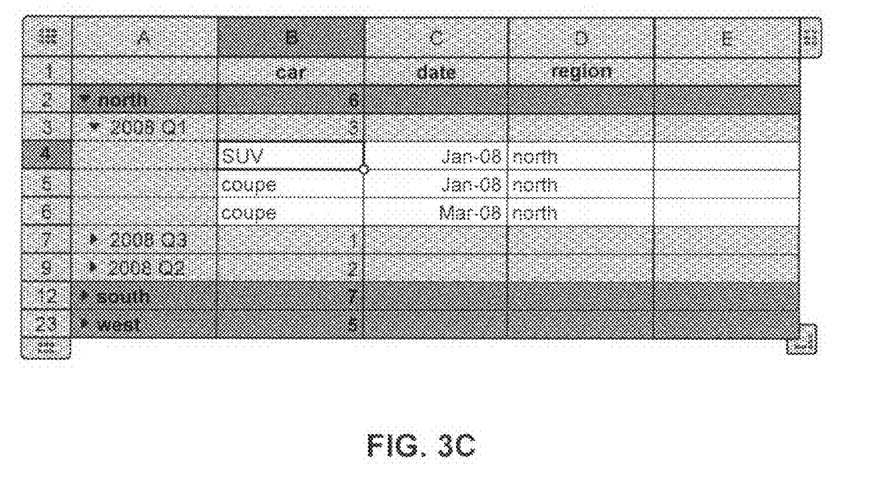

FIGS. 3A-3C illustrate various embodiments of including a summary function for the group divisions of the table of FIG. 2C. FIG. 3A illustrates an embodiment of a user interface for selecting a summary function. As depicted, the Count function is selected in this example. The Count function provides a count of the number of rows of data in an associated group division. FIG. 3B illustrates an embodiment of a result of selecting the Count function. In the given example, the Count function is selected for both parent ("region") and child ("date") group divisions, and a resulting count value is included in each group division row. FIG. 3C illustrates an embodiment of a view of the table of FIG. 3B with most of the group divisions collapsed. Although the data rows in the collapsed group divisions are hidden, the Count function result of each group division remains available in the corresponding group division row and, in this example, provides a summary of the number of rows included in each group division. As in the given example, collapsing one or more group divisions may result in a more manageable table size, and inclusion of a summary function allows one or more statistics of collapsed rows to still be available.

Figure 4:
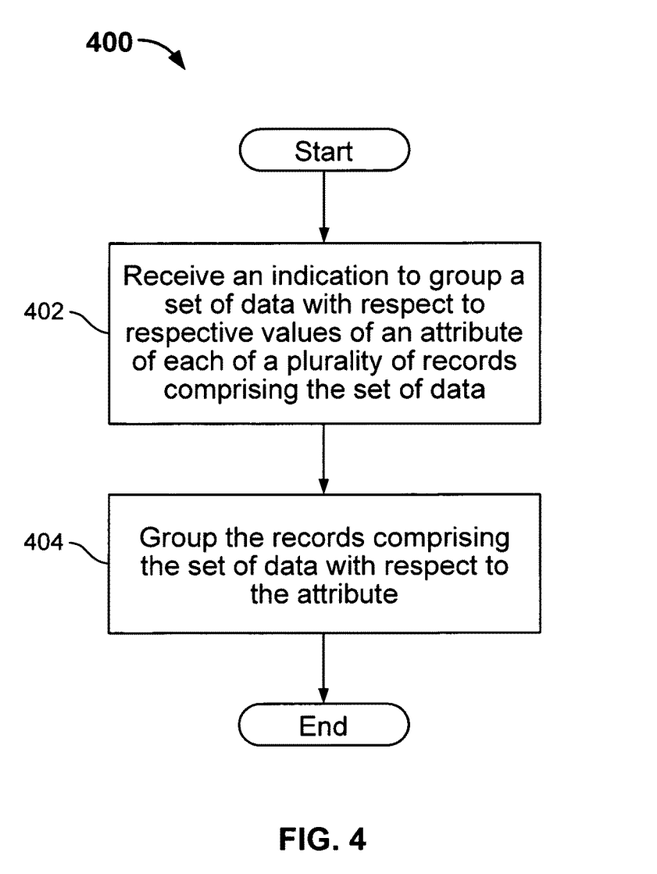
FIG. 4 illustrates an embodiment of a process for grouping a set of data.

FIG. 4 illustrates an embodiment of a process for grouping a set of data. For example, process 400 may be employed for the groupings of the tables in FIG. 1C, FIG. 1D, FIG. 2A, FIG. 2C, FIG. 3A, FIG. 3B, and FIG. 3C. Process 400 starts at 402 at which an indication to group a set of data with respect to respective values of an attribute of each of a plurality of records comprising the set of data is received. In some embodiments, the plurality of records comprises rows of the set of data and the attribute comprises a specified column of the set of data. In some embodiments, the plurality of records comprises columns of the set of data and the attribute comprises a specified row of the set of data. At 404, the records comprising the set of data are grouped with respect to the attribute. Process 400 subsequently ends. In some embodiments, the view and the grouping of the set of data is based on real time values of the set of data and is automatically and dynamically updated in response to changes in the set of data. Changes in the set of data cause an immediate reevaluation of the grouping criteria and result in a live refresh of the grouping (and/or associated summary functions), if necessary. In some embodiments, a grouping simply changes a view of the set of data and can be removed if desired.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product for processing a table, the computer program product being embodied in a non-transitory computer readable storage medium and comprising computer instructions for:
   receiving a selection of an option to group rows of a table of spreadsheet cells with respect to respective values of a plurality of columns of the table; and
   grouping rows comprising the table according to values of the plurality of columns while continuing to provide spreadsheet functionality with respect to cells comprising the grouped table.

2. The computer program product recited in claim 1, wherein a grouping of the table is based on real-time values of data comprising the table.

3. The computer program product recited in claim 1, wherein a view and/or a grouping of the table is dynamically updated in response to a change in data comprising the table.

4. The computer program product recited in claim 1, wherein grouping the table changes a view or layout of the table.

5. The computer program product recited in claim 1, wherein grouping rows comprising the table comprises sorting rows comprising the table with respect to the plurality of columns.

6. The computer program product recited in claim 1, wherein grouping rows comprising the table comprises pivoting a portion of the table associated with the plurality of columns.

7. The computer program product recited in claim 1, further comprising computer instructions for creating one or more group divisions for the values comprising the plurality of columns.

8. The computer program product recited in claim 7, wherein a group division is created for each unique value comprising the plurality of columns.

9. The computer program product recited in claim 7, further comprising computer instructions for selecting an interval for group divisions of values comprising the plurality of columns.

10. The computer program product recited in claim 7, further comprising computer instructions for adding a group division row to the table for each group division.

11. The computer program product recited in claim 7, further comprising computer instructions for including one or more summary functions with one or more group divisions.

12. The computer program product recited in claim 11, wherein one or more summary functions are dynamically updated in response to a change in the table that affects the one or more summary functions.

13. A system for processing a table, comprising:
   a processor configured to:
      receive a selection of an option to group rows of a table of spreadsheet cells with respect to respective values of a plurality of columns of the table; and
      group rows comprising the table according to values of the plurality of columns while continuing to provide spreadsheet functionality with respect to cells comprising the grouped table; and
   a memory coupled to the processor and configured to provide the processor with instructions.

14. The system recited in claim 13, wherein a grouping of the table is based on real time values of data comprising the table.

15. The system recited in claim 13, wherein a view and/or a grouping of the table is dynamically updated in response to a change in data comprising the table.

16. A method for processing a table, comprising:
   receiving a selection of an option to group rows of a table of spreadsheet cells with respect to respective values of a plurality of columns of the table and
   using a processor to group rows comprising the table according to values of the plurality of columns while continuing to provide spreadsheet functionality with respect to cells comprising the grouped table.

17. The method recited in claim 16, wherein a grouping of the table is based on real time values of data comprising the table.

18. The method recited in claim 16, wherein a view and/or a grouping of the table is dynamically updated in response to a change in data comprising the table.

* * * * *